US012755972B2

(12) United States Patent
Iida et al.

(10) Patent No.: US 12,755,972 B2
(45) Date of Patent: Oct. 6, 2026

(54) SECONDARY BATTERY

(71) Applicant: Panasonic Intellectual Property Management Co., Ltd., Osaka (JP)

(72) Inventors: Kazuhiro Iida, Nara (JP); Masanobu Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 560 days.

(21) Appl. No.: 17/763,074

(22) PCT Filed: Jul. 28, 2020

(86) PCT No.: PCT/JP2020/028824
§ 371 (c)(1),
(2) Date: Mar. 23, 2022

(87) PCT Pub. No.: WO2021/059726
PCT Pub. Date: Apr. 1, 2021

(65) Prior Publication Data

US 2022/0376249 A1 Nov. 24, 2022

(30) Foreign Application Priority Data

Sep. 27, 2019 (JP) ................................ 2019-177643

(51) Int. Cl.
*H01M 4/587* (2010.01)
*H01M 4/02* (2006.01)
(Continued)

(52) U.S. Cl.
CPC ....... *H01M 4/587* (2013.01); *H01M 10/0525* (2013.01); *H01M 10/0569* (2013.01);
(Continued)

(58) Field of Classification Search
CPC ........... H01M 2004/027; H01M 4/587; H01M 10/0525; H01M 10/0569
See application file for complete search history.

(56) References Cited

U.S. PATENT DOCUMENTS

| | | | |
|---|---|---|---|
| 6,040,092 | A | 3/2000 | Yamada et al. |
| 6,645,667 | B1 | 11/2003 | Iwamoto et al. |

(Continued)

FOREIGN PATENT DOCUMENTS

| | | | | |
|---|---|---|---|---|
| CN | 105580184 A | 5/2016 | | |
| EP | 2202829 A1 * | 6/2010 | ............. | H01M 4/40 |

(Continued)

OTHER PUBLICATIONS

Extended (Supplementary) European Search Report dated Nov. 18, 2022, issued in counterpart EP application No. 20867809.4. (8 pages).

(Continued)

*Primary Examiner* — Basia A Ridley
*Assistant Examiner* — Jonathan William Estes
(74) *Attorney, Agent, or Firm* — WHDA, LLP

(57) ABSTRACT

A secondary battery according to the present invention comprises a positive electrode, a negative electrode and an electrolyte solution; the electrolyte solution contains a lithium salt and a solvent containing water; the negative electrode comprises a negative electrode active material that contains a carbon material; with respect to the carbon material, the peak intensity ratio (D/G value) of the D band to the G band in a Raman spectrum as obtained by Raman spectroscopy is from 0.05 to 0.7; a coating film is formed on the surface of the carbon material; and with respect to the coating film, if P1 is the peak intensity of the 1 s electron orbital of an F atom at around the binding energy of 685 eV and P2 is the peak intensity of the 1s electron orbital of an (Continued)

O atom at around the binding energy of 532 eV in an XPS spectrum as determined by X-ray photoelectron spectroscopy, the ratio of the peak intensity P1 to the peak intensity P2, namely the value of P1/P2 is from 1.0 to 3.0.

18 Claims, 1 Drawing Sheet

(51) Int. Cl.
*H01M 10/0525* (2010.01)
*H01M 10/0569* (2010.01)

(52) U.S. Cl.
CPC ................. *H01M 2004/027* (2013.01); *H01M 2300/0034* (2013.01)

(56) References Cited

U.S. PATENT DOCUMENTS

| | | | | |
|---|---|---|---|---|
| 9,979,012 | B2 * | 5/2018 | Natsui | H01M 4/485 |
| 10,411,302 | B2 | 9/2019 | Park et al. | |
| 2013/0244121 | A1 | 9/2013 | Gogotsi et al. | |
| 2014/0065479 | A1 | 3/2014 | Yamada et al. | |
| 2015/0349332 | A1 * | 12/2015 | Azami | H01M 10/058 429/188 |
| 2016/0043384 | A1 | 2/2016 | Zhamu et al. | |
| 2016/0226100 | A1 * | 8/2016 | Yamada | H01M 10/0569 |
| 2017/0169912 | A1 | 6/2017 | Gogotsi et al. | |
| 2017/0373351 | A1 | 12/2017 | Kawai et al. | |
| 2018/0019475 | A1 | 1/2018 | Adamson et al. | |
| 2018/0083321 | A1 * | 3/2018 | Hotta | H01M 4/485 |
| 2018/0123171 | A1 | 5/2018 | Takechi et al. | |
| 2018/0219221 | A1 | 8/2018 | Yamauchi | |
| 2018/0366726 | A1 * | 12/2018 | Kawakami | H01M 4/1391 |
| 2019/0036173 | A1 | 1/2019 | Tojigamori et al. | |
| 2019/0088948 | A1 | 3/2019 | Tojigamori et al. | |
| 2019/0089007 | A1 | 3/2019 | Suyama et al. | |
| 2019/0173087 | A1 * | 6/2019 | Sawada | H01G 11/36 |
| 2019/0296337 | A1 * | 9/2019 | Yasuda | B60L 50/64 |
| 2020/0091510 | A1 * | 3/2020 | Park | H01M 4/587 |
| 2021/0028452 | A1 | 1/2021 | Su et al. | |

FOREIGN PATENT DOCUMENTS

| | | | | |
|---|---|---|---|---|
| JP | 2001-052747 | A | | 2/2001 |
| JP | 3475488 | B2 | * | 12/2003 |
| JP | 2018-006358 | A | | 1/2018 |
| JP | 2018-073819 | A | | 5/2018 |
| JP | 2018-139171 | A | | 9/2018 |
| JP | 6423453 | B2 | | 11/2018 |
| JP | 2019-029077 | A | | 2/2019 |
| JP | 2019-057359 | A | | 4/2019 |
| KR | 10-2006-0063035 | A | | 6/2006 |
| WO | 2004/023589 | A1 | | 3/2004 |

OTHER PUBLICATIONS

Profatilova et al., "Enhanced thermal properties of the solid electrolyte interphase formed on graphite in an electrolyte with fluoroethylene carbonate", Electrochimica Acta, 2009, vol. 54, No. 19, pp. 4445-4450, cited in EP Extended European Search Report dated Nov. 18, 2022. (6 pages).
Office Action dated Sep. 26, 2023, issued in counterpart CN application No. 202080067560.2, with partial English translation. (11 pages).
International Search Report dated Oct. 13, 2020, issued in counterpart International Application No. PCT/JP2020/028824, with English Translation. (4 pages).
Leroy et al., Influence of the lithium salt nature over the surface film formation on a graphite electrode in Li-ion batteries: An XPS study, Dec. 12, 2006, Elsevier; Cited in US Office Action dated Dec. 16, 2024, issued in related U.S. Appl. No. 17/763,102. (12 pages).
Non-Final Office Action dated Dec. 16, 2024, issued in U.S. Appl. No. 17/763,102. (13 pages).
International Search Report dated Oct. 13, 2020, issued in Application No. PCT/JP2020/028825. (4 pages).
Non-Final Office Action dated Sep. 25, 2024, issued in U.S. Appl. No. 17/763,053. (34 pages).
Office Action dated May 13, 2024, issued in CN Application No. 202080066551.1, with Partial English translation. (10 pages).
Office Action dated Nov. 10, 2023, issued in CN Application No. 202080066551.1, with Partial English translation. (12 pages).
Extended Supplementary European Search Report dated Nov. 18, 2022, issued in Application No. 20868480.3. (10 pages).
International Search Report dated Oct. 13, 2020, issued in Application No. PCT/JP2020/028823. (4 pages).

* cited by examiner

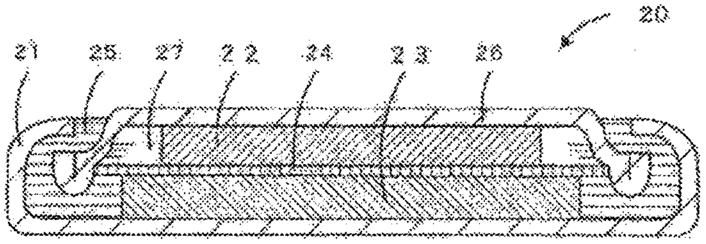
20
21
25
27
22
24
23
26

SECONDARY BATTERY

TECHNICAL FIELD

The present disclosure generally relates to a secondary battery.

BACKGROUND ART

Commonly used as a secondary battery with a high output and a high energy density is a lithium-ion secondary battery comprising a positive electrode, a negative electrode, and an electrolyte liquid, and performing charge and discharge by allowing lithium ions to travel between the positive electrode and the negative electrode. In the conventional secondary battery, an organic solvent-based electrolyte liquid is used for achieving the high energy density.

However, organic solvents are generally flammable, and pose an important challenge of ensuring safety. In addition, organic solvents have a lower ion conductivity than an aqueous solution, and therefore causes a problem of not-sufficient rapid charge-discharge characteristics.

In view of such problems, a secondary battery using an electrolyte liquid containing water (hereinafter, which may be referred to as an aqueous electrolyte liquid) has been studied. For example, Patent Literature 1 proposes use of an aqueous solution including an alkaline salt at a high concentration as an aqueous electrolyte liquid of a secondary battery. Patent Literature 2 proposes a use of an aqueous electrolyte liquid in which an organic carbonate is added into an aqueous solution including an alkaline salt at a high concentration.

CITATION LIST

Patent Literature

PATENT LITERATURE 1: JP 6423453 B
PATENT LITERATURE 2: JP 2018-73819 A

SUMMARY

In a secondary battery having an aqueous electrolyte liquid, use of a carbon material as a negative electrode active material leads to a very low charge-discharge efficiency.

A secondary battery of an aspect of the present disclosure comprises: a positive electrode; a negative electrode; and an electrolyte liquid, wherein the electrolyte liquid includes: a solvent containing water; and a lithium salt, the negative electrode has a negative electrode active material including a carbon material, the carbon material has a peak intensity ratio of a D band to a G band (D/G value) of 0.05 to 0.7 in a Raman spectrum obtained by Raman spectroscopy, the carbon material has a coating formed on a surface thereof, and in an XPS spectrum measured by X-ray photoelectron spectroscopy, when an intensity of a peak appearing near a bond energy of 685 eV and corresponding to a 1s electron orbital of a F atom is defined as P1, and an intensity of a peak appearing near a bond energy of 532 eV and corresponding to a 1s electron orbital of an O atom is defined as P2, the coating has a ratio of the peak intensity P1 to the peak intensity P2 (P1/P2 value) of 1.0 to 3.0.

It is to be noted that near 685 eV denotes a range of 684 eV to 686 eV, and near 532 eV denotes a range of 530 eV to 534 eV. The description “a numerical value (1) to a numerical value (2)” herein means the numerical value (1) or more and the numerical value (2) or less.

According to the secondary battery according to the present disclosure, a charge-discharge efficiency may be improved.

BRIEF DESCRIPTION OF DRAWING

The FIGURE is a schematic sectional view illustrating an example of a secondary battery of the present embodiment.

DESCRIPTION OF EMBODIMENTS

Generally, the reductive decomposition of an aqueous electrolyte liquid including a solvent including water and a lithium salt occurs at a potential between near or lower than approximately 2 V with reference to Li, and charge and discharge reactions of a carbon material occur at a potential equal to or lower than the reductive decomposition of the aqueous electrolyte liquid. Thus, a vigorous reductive decomposition of the aqueous electrolyte liquid during charge and discharge consumes a charging current, which inhibits progress of a charge reaction of a negative electrode active material, leading to lowered charge-discharge efficiency of the battery. The present inventors have made intensive investigation, and as a result, have found that the charge-discharge efficiency of a secondary battery may be improved by the crystallinity of a carbon material (negative electrode active material) and a coating formed on a surface of the carbon material, and have reached a secondary battery of the following aspect.

A secondary battery of an aspect of the present disclosure comprises: a positive electrode; a negative electrode; and an electrolyte liquid, wherein the electrolyte liquid includes: a solvent containing water; and a lithium salt, the negative electrode has a negative electrode active material including a carbon material, the carbon material has a peak intensity ratio of a D band to a G band (D/G value) of 0.05 to 0.7 in a Raman spectrum obtained by Raman spectroscopy, the carbon material has a coating formed on a surface thereof, and in an XPS spectrum measured by X-ray photoelectron spectroscopy, when an intensity of a peak appearing near a bond energy of 685 eV and corresponding to a 1s electron orbital of a F atom is defined as P1, and an intensity of a peak appearing near a bond energy of 532 eV and corresponding to a 1s electron orbital of an O atom is defined as P2, the coating has a ratio of the peak intensity P1 to the peak intensity P2 (P1/P2 value) of 1.0 to 3.0. According to the secondary battery of an aspect of the present disclosure, the charge-discharge efficiency may be improved.

In a Raman spectrum obtained by Raman spectroscopy, “D band” denotes a Raman band near 1360 $cm^{-1}$ derived from a defect or an amorphous carbon component. “G band” denotes a Raman band near 1580 $cm^{-1}$ derived from a C═C bond. When the peak intensity ratio of the D band to the G band (hereinafter, which may be referred to simply as a D/G value) is 0.05 to 0.7, the surface of the carbon material has a relatively higher regularity of crystals and a uniform electrochemically active points; thus, the coating formed on the surface of the carbon material by the reductive decomposition of the electrolyte liquid becomes a thinner coating than that in an amorphous material. Here, the coating on the surface of the carbon material of the present disclosure is a coating having a ratio of the peak intensity P1 of a peak appearing near a bond energy of 685 eV and corresponding to a 1s electron orbital of a F atom, to the peak intensity P2 of a peak appearing near a bond energy of 532 eV and corresponding to a 1s electron orbital of an O atom (hereinafter, which may be referred to simply as a P1/P2 value), of 1.0 to 3.0. Since the peak appearing near a bond energy of 685 eV and corresponding to a 1s electron orbital of F atom is a peak derived from LiF constituting the coating, and the peak appearing near a bond energy of 532 eV and corresponding to a 1s electron orbital of 0 atom is a peak derived from $Li_2CO_3$ constituting the coating, the coating formed on the surface of the carbon material of the present disclosure is indicated to contain a large amount of LiF. Since LiF has a low solubility in water, the coating including a large amount of LiF is an electrochemically stable coating. Therefore, the coating of the present disclosure, which is a stable coating including a large amount of LiF having a low solubility in water, prevents a contact between water in the aqueous electrolyte liquid and the carbon material to inhibit further reductive decomposition of the aqueous electrolyte liquid. As a result, the charge-discharge efficiency of the secondary battery is improved.

Hereinafter, an embodiment of the secondary battery according to the present disclosure will be described in detail.

The shape of the secondary battery of the present embodiment is not particularly limited, and examples thereof include coin, button, sheet, stacked, cylindrical, flat, and rectangular shapes. The FIGURE is a schematic sectional view illustrating an example of the secondary battery of the present embodiment. A secondary battery 20 illustrated in the FIGURE comprises: a cap-shaped battery case 21; a positive electrode 22 provided in the upper part of the battery case 21; a negative electrode 23 provided at a position opposite to the positive electrode 22 with a separator 24 interposed therebetween; a gasket 25 formed with an insulating material; and a sealing plate 26 to seal the battery case 21 with the gasket 25 provided on an opening of the battery case 21. In the secondary battery 20 illustrated in the FIGURE, an electrolyte liquid 27 fills a space between the positive electrode 22 and the negative electrode 23. Hereinafter, the electrolyte liquid 27, the positive electrode 22, the negative electrode 23, and the separator 24 will be described in detail.

The electrolyte liquid 27 is an aqueous electrolyte liquid including: a solvent including water; and a lithium salt. Since including water, which has no flammability, the aqueous electrolyte liquid may enhance the safety of the secondary battery 20. The solvent may be only water, but a content of water is preferably 10% or more and less than 50% at a volume rate based on a total amount of the solvent included in the electrolyte liquid 27. With the content of water within the above range, for example, the charge-discharge efficiency of the battery may be improved in some cases.

The amount of water included in the electrolyte liquid 27 is preferably 0.5 mol to 4 mol, and more preferably 0.5 mol to 3 mol, based on 1 mol of the lithium salt. The amount of water included in the electrolyte liquid 27 within the above range may enlarge a potential window of the electrolyte liquid 27 to raise an applied voltage to the secondary battery 20, for example.

The electrolyte liquid 27 may include a solvent other than water. Examples of the solvent other than water include organic solvents such as esters, ethers, nitriles, alcohols, ketones, amines, amides, sulfur compounds, and hydrocarbons. The organic solvent may be a halogen-substituted solvent in which at least some hydrogens in these solvents are substituted with halogen atoms such as fluorine. Specific examples thereof include: cyclic carbonates such as ethylene carbonate, propylene carbonate, vinylidene carbonate, and butylene carbonate; chain carbonates such as dimethyl carbonate, methyl ethyl carbonate, and diethyl carbonate; and fluorinated carbonates including fluorine as a constitution element such as fluoroethylene carbonate, fluorodimethyl carbonate, and methyl fluoropropionate. Among the above examples, cyclic carbonates and fluorinated carbonates including fluorine as a constitution element are particularly preferable from the viewpoints of, for example, inhibition of self-discharge of the battery, improvement in the charge-discharge efficiency of the battery, and the like.

The content ratio of the solvent other than water (organic solvent) to the lithium salt is preferably within a range of 1:0.01 to 1:5, and more preferably within a range of 1:0.05 to 1:2, at a molar ratio. With the content ratio within the above range, lowering of the self-discharge of the battery may be inhibited effectively and the charge-discharge efficiency of the battery may be further improved.

Any compound may be used as the lithium salts as long as it is dissolved and dissociated in the solvent containing water to provide lithium ions in the electrolyte liquid 27. The lithium salt preferably causes no deterioration of battery characteristics due to a reaction with materials constituting the positive electrode and the negative electrode. Examples of such a lithium salt include: salts with an inorganic acid such as perchloric acid, sulfuric acid, and nitric acid; salts with a halide ion such as chloride ion and bromide ion; and salts with an organic anion including a carbon atom in the structure.

Examples of the organic anion constituting the lithium salt include anions represented by the following general formulas (i) to (vi).

$$(R^1SO_2)(R^2SO_2)N^- \quad \text{(i)}$$

(Each of $R^1$ and $R^2$ is independently selected from an alkyl group or a halogen-substituted alkyl group. $R^1$ and $R^2$ may be bonded to each other to form a ring.)

$$R^3SO_3^- \quad \text{(ii)}$$

($R^3$ is selected from an alkyl group or a halogen-substituted alkyl group.)

$$R^4CO_2^- \quad \text{(iii)}$$

($R^4$ is selected from an alkyl group or a halogen-substituted alkyl group.)

$$(R^5SO_2)_3C^- \quad \text{(iv)}$$

($R^5$ is selected from an alkyl group or a halogen-substituted alkyl group.)

$$[(R^6SO_2)N(SO_2)N(R^7SO_2)]^{2-} \quad \text{(v)}$$

($R^6$ and $R^7$ are selected from an alkyl group or a halogen-substituted alkyl group.)

$$[(R^8SO_2)N(CO)N(R^9SO_2)]^{2-} \quad \text{(vi)}$$

($R^8$ and $R^9$ are selected from an alkyl group or a halogen-substituted alkyl group.)

In the general formulas (i) to (vi), the number of carbon atoms of the alkyl group or the halogen-substituted alkyl group is preferably 1 to 6, more preferably 1 to 3, and still more preferably 1 to 2. The halogen in the halogen-substituted alkyl group is preferably fluorine. The number of the halogen substitution of the halogen-substituted alkyl group is equal to or smaller than the number of hydrogen atoms of the original alkyl group.

Each of $R^1$ to $R^9$ is, for example, a group represented by the following general formula (vii).

$$C_nH_aF_bCl_cBr_dI_e \quad \text{(vii)}$$

(n is an integer of 1 or more, a, b, c, d, and e are integers of 0 or more, and 2n+1=a+b+c+d+e is satisfied).

Specific examples of the organic anions represented by the general formula (i) include bis(trifluoromethanesulfonyl)imide (TFSI; $[N(CF_3SO_2)_2]^-$), bis(perfluoroethanesulfonyl)imide (BETI; $[N(C_2F_5SO_2)_2]^-$), and (perfluoroethanesulfonyl)(trifluoromethanesulfonyl)imide ($[N(C_2F_5SO_2)(CF_3SO_2)]^-$). Specific examples of the organic anions represented by the general formula (ii) include $CF_3SO_3^-$ and $C_2F_5SO_3$. Specific examples of the organic anions represented by the general formula (iii) include $CF_3CO_2$ and $C_2F_5CO_2$. Specific examples of the organic anions represented by the general formula (iv) include tris(trifluoromethanesulfonyl)carbon acid ($[(CF_3SO_2)_3C]^-$) and tris(perfluoroethanesulfonyl)carbon acid ($[(C_2F_5SO_2)_3C]^-$). Specific examples of the organic anions represented by the general formula (v) include sulfonyl bis(trifluoromethanesulfonyl) imide ($[(CF_3SO_2)N(SO_2)N(CF_3SO_2)]^{2-}$), sulfonyl bis(perfluoroethanesulfonyl)imide ($[(C_2F_5SO_2)N(SO_2)N(C_2F_5SO_2)]^{2-}$), and sulfonyl (perfluoroethanesulfonyl)(trifluoromethanesulfonyl)imide ($[(C_2F_5SO_2)N(SO_2)N(CF_3SO_2)]^{2-}$). Specific examples of the organic anions represented by the general formula (vi) include carbonyl bis(trifluoromethanesulfonyl)imide ($[(CF_3SO_2)N(CO)N(CF_3SO_2)]^{2-}$), carbonyl bis(perfluoroethanesulfonyl)imide ($[(C_2F_5SO_2)N(CO)N(C_2F_5SO_2)]^{2-}$), and carbonyl (perfluoroethanesulfonyl)(trifluoromethanesulfonyl)imide ($[(C_2F_5SO_2)N(CO)N(CF_3SO_2)]^{2-}$).

Examples of organic anions other than the organic anions of the general formulas (i) to (vi) include anions such as bis(1,2-benzenediolate(2-)-O,O')borate, bis(2,3-naphthalenediolate(2-)-O,O')borate, bis(2,2'-biphenyldiolate(2-)-O,O')borate, and bis(5-fluoro-2-olate-1-benzenesulfonate-O,O')borate.

The anion constituting the lithium salt is preferably an imide anion. Specific example of preferable imide anions include, in addition to the imide anions exemplified as the organic anions represented by the general formula (i), bis(fluorosulfonyl)imide (FSI; $[N(FSO_2)_2]^-$) and (fluorosulfonyl)(trifluoromethanesulfonyl)imide (FTI; $[N(FSO_2)(CF_3SO_2)]^-$).

Examples of the lithium salt having lithium ion and the imide anion include, from the viewpoints of effective inhibition of the self-discharge of the battery and the like, lithium bis(trifluoromethanesulfonyl)imide (LiTFSI), lithium bis(perfluoroethanesulfonyl)imide (LiBETI), lithium (perfluoroethanesulfonyl)(trifluoromethanesulfonyl)imide, lithium bis(fluorosulfonyl)imide (LiF SI), and lithium (fluorosulfonyl)(trifluoromethanesulfonyl)imide (LiFTI). These lithium salts may be used singly, or may be used in combination of two or more thereof.

Specific examples of other lithium salts include $CF_3SO_3Li$, $C_2F_5SO_3Li$, $CF_3CO_2Li$, $C_2F_5CO_2Li$, $(CF_3SO_2)_3CLi$, $(C_2F_5SO_2)_3CLi$, $(C_2F_5SO_2)_2(CF_3SO_2)CLi$, $(C_2F_5SO_2)(CF_3SO_2)_2CLi$, $[(CF_3SO_2)N(SO_2)N(CF_3SO_2)]Li_2$, $[(C_2F_5SO_2)N(SO_2)N(C_2F_5SO_2)]Li_2$, $[(C_2F_5SO_2)N(SO_2)N(CF_3SO_2)]Li_2$, $[(CF_3SO_2)N(CO)N(CF_3SO_2)]Li_2$, $[(C_2F_5SO_2)N(CO)N(C_2F_5SO_2)]Li_2$, $[(C_2F_5SO_2)N(CO)N(CF_3SO_2)]Li_2$, lithium bis(1,2-benzenediolate(2-)-O,O')borate, lithium bis(2,3-naphthalenediolate(2-)-O,O')borate, lithium bis(2, 2'-biphenyldiolate(2-)-O,O')borate, lithium bis(5-fluoro-2-olate-1-benzenesulfonate-O,O')borate, lithium perchlorate ($LiClO_4$), lithium chloride (LiCl), lithium bromide (LiBr), lithium hydroxide (LiOH), lithium nitrate ($LiNO_3$), lithium sulfate ($Li_2SO_4$), lithium sulfide ($Li_2S$), and lithium hydroxide (LiOH). These lithium salts may be used singly, or may be used in combination of two or more thereof.

The electrolyte liquid 27 preferably includes an additive. The additive is added for improving, for example, battery performances, and any of conventionally known additives may be used. In particular, a dicarbonyl group-containing compound is preferable from the viewpoints of forming an electrochemically stable coating on the carbon material by the reduction reaction of the electrolyte liquid 27 to effectively inhibit the reductive decomposition reaction of the electrolyte liquid 27, and the like.

Examples of the dicarbonyl group-containing compound include succinic acid, glutaric acid, phthalic acid, maleic acid, citraconic acid, glutaconic acid, itaconic acid, and diglycolic acid. The dicarbonyl group-containing compound may be an anhydride, and examples thereof include succinic anhydride, glutaric anhydride, phthalic anhydride, maleic anhydride, citraconic anhydride, glutaconic anhydride, itaconic anhydride, and diglycolic anhydride. Among the above compounds, succinic acid, succinic anhydride, maleic acid, maleic anhydride, diglycolic acid, glutaric acid, and the like are preferable from the viewpoint of forming an electrochemically stable coating on the carbon material to effectively inhibit the reductive decomposition reaction of the electrolyte liquid 27. Among them, succinic acid and succinic anhydride are preferable. These compounds may be used singly, or may be used in combination of two or more thereof.

The content of the additive is preferably, for example, 0.1 mass % or more and 5.0 mass % or less, and more preferably 0.5 mass % or more and 3.0 mass % or less, based on a total amount of the electrolyte liquid 27. The content within the above range may effectively inhibit the reductive decomposition reaction of the electrolyte liquid 27 compared with a case out of the above range.

The positive electrode 22 comprises, for example, a positive electrode current collector and a positive electrode mixture layer formed on the positive electrode current collector. For the positive electrode current collector, a foil of a metal electrochemically and chemically stable within a potential range of the positive electrode, a film in which such a metal is disposed on a surface layer thereof, and the like may be used. A form of the positive electrode current collector is not particularly limited, and a porous body of the metal such as, for example, a mesh, a punching sheet, and an expanded metal may be used. For a material of the positive electrode current collector, known metals usable in a secondary battery using an aqueous electrolyte liquid and the like may be used. Examples of such a metal include stainless steel, Al, an aluminum alloy, and Ti. A thickness of the positive electrode current collector is preferably, for example, 3 μm or more and 50 μm or less from the viewpoints of current collectability, mechanical strength, and the like.

The positive electrode mixture layer includes a positive electrode active material. The positive electrode mixture layer may include a binder, a conductive agent, and the like.

Examples of the positive electrode active material include a lithium-transition metal oxide containing lithium (Li) and a transition metal element such as cobalt (Co), manganese (Mn), and nickel (Ni). In addition, examples of the positive electrode active material include a transition metal sulfide, a metal oxide, a lithium-containing polyanionic compound including one or more transition metals such as lithium iron phosphate ($LiFePO_4$) and lithium iron pyrophosphate ($Li_2FeP_2O_7$), a sulfur-base compound ($Li_2S$), and oxygen and an oxygen-containing metal salt such as lithium oxide. The positive electrode active material is preferably the lithium-containing transition metal oxide, and preferably includes at least one of the group consisting of Co, Mn, and Ni as the transition metal element.

The lithium-transition metal oxide may include an additional element other than Co, Mn, and Ni, and for example, may include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium-transition metal oxide include $LixCoO_2$, $LixNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (in each chemical formula, M is at least one of the group consisting of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$). The lithium-transition metal oxide may be used singly, or may be used in combination of a plurality thereof. The lithium-transition metal oxide preferably contains 80 mol % or more of Ni based on a total amount of transition metals excluding lithium from the viewpoint of increase in a capacity. From the viewpoint of a stability of a crystal structure, the lithium-transition metal oxide is more preferably $Li_aNi_bCo_cAl_dO_2$ ($0<a\leq1.2$, $0.8\leq b<1$, $0<c<0.2$, $0<d\leq0.1$, and $b+c+d=1$).

For the conductive agent, known conductive agents that enhance an electroconductivity of the positive electrode mixture layer may be used. Examples thereof include carbon materials such as carbon black, acetylene black, Ketjenblack, graphite, carbon nanofiber, carbon nanotube, and graphene. For the binder, known binders that maintain a good contacting state of the positive electrode active material and the conductive agent and enhance adhesiveness of the positive electrode active material and the like to a surface of the positive electrode current collector may be used. Examples thereof include a fluororesin such as polytetrafluoroethylene (PTFE) and polyvinylidene fluoride (PVDF), polyacrylonitrile (PAN), a polyimide, an acrylic resin, a polyolefin, carboxymethyl cellulose (CMC) or a salt thereof, styrene-butadiene rubber (SBR), polyethylene oxide (PEO), polyvinyl alcohol (PVA), and polyvinylpyrrolidone (PVP).

The positive electrode 22 may be manufactured by, for example, applying a positive electrode mixture slurry including the positive electrode active material, the binder, the conductive agent, and the like on the positive electrode current collector, and drying and rolling the applied film to form the positive electrode mixture layer on the positive electrode current collector.

The negative electrode 23 comprises, for example, a negative electrode current collector and a negative electrode mixture layer formed on the negative electrode current collector. For the negative electrode current collector, a foil of a metal electrochemically and chemically stable within a potential range of the negative electrode, a film in which such a metal is disposed on a surface layer thereof, and the like may be used. A form of the negative electrode current collector is not particularly limited, and a porous body of the metal such as, for example, a mesh, a punching sheet, and an expanded metal may be used. For a material of the negative electrode current collector, known metals usable in a secondary battery using an aqueous electrolyte liquid and the like may be used. Examples of such a metal include Al, Ti, Mg, Zn, Pb, Sn, Zr, and In. These may be used singly, or may be in an alloy of two or more thereof, and may be constituted by a material mainly composed of at least one of the metals. When the material includes two or more elements, these elements are not necessarily alloyed. A thickness of the negative electrode current collector is preferably, for example, 3 μm or more and 50 μm or less from the viewpoints of current collectability, mechanical strength, and the like.

The negative electrode mixture layer includes a negative electrode active material. The negative electrode mixture layer may include a binder, a conductive agent, and the like. For the conductive agent and the binder, ones similar to the positive electrode side may be used.

The negative electrode active material includes the carbon material. The carbon material may have, as above, a peak intensity ratio of the D band to the G band (D/G value) of 0.05 to 0.7 in the Raman spectrum obtained by Raman spectroscopy from the viewpoints of improvement in the charge-discharge efficiency of the battery, and the like. The D/G value is preferably 0.2 to 0.7, and more preferably 0.4 to 0.7, from the viewpoint of further improvement in the charge-discharge efficiency of the negative electrode.

The Raman spectrum of the carbon material may be measured by using a commercially available Raman spectroscopic device. Preferable examples of the Raman spectroscopic device may include laser Raman microspectrometer "NRS-5100", manufactured by JASCO Corporation.

The carbon material is not particularly limited as long as the carbon material has the D/G value satisfying the above range, but preferably, for example, a surface-modified carbon material in which an amorphous carbon coats a surface of graphite particles from the viewpoint of easiness of controlling the D/G value. For example, regulating a mass rate of the amorphous carbon in the surface-modified carbon material to regulate a coating thickness of the amorphous carbon may control the D/G value of the carbon material. An amount of the amorphous carbon in the surface-modified carbon material is preferably 0.1 parts by mass to 50 parts by mass, and more preferably 0.1 parts by mass to 10 parts by mass, based on 100 parts by mass of the graphite. The mass rate of the amorphous carbon in the surface-modified carbon material within the above range easily provides the carbon material having the D/G value satisfying the above range.

The graphite to be a core of the surface-modified carbon material is, for example, a natural graphite such as flake graphite, massive graphite, and amorphous graphite; and an artificial graphite such as massive artificial graphite (MAG) and graphitized mesophase-carbon microbead (MCMB). The amorphous carbon with which the surface of the graphite particles is coated is, for example, a calcined product of petroleum pitch or tar, coal-tar pitch or tar, thermoplastic resin, thermosetting resin, or the like. The amorphous carbon is formed by, for example, adhering pitch on an entire surface of the graphite particles, and then calcining the mixture under an inert gas atmosphere at a temperature of 900 to 1500° C., preferably 1200 to 1300° C. The above method is an example, and conventionally known methods may be used as a method of coating the surface of the graphite particles with the amorphous carbon. A usable method is, for example, solid phase methods for coating such as a mechano-fusion method in which a compressive shear stress is applied between the graphite particles and the amorphous carbon for coating, and a spattering method; and a liquid phase method in which the amorphous carbon is dissolved in a solvent such as toluene and the graphite particles is immersed therein, then subjected to heat treatment.

The carbon material has a coating formed on a surface thereof. From the viewpoint of improvement in the charge-discharge efficiency of the battery, the coating may have a ratio of the peak intensity P1 of a peak appearing near a bond energy of 685 eV and corresponding to a 1s electron orbital of a F atom, to the peak intensity P2 of a peak appearing near a bond energy of 532 eV and corresponding to a 1s electron orbital of an O atom (hereinafter, which may be referred to simply as a P1/P2 value), of 1.0 to 3.0. The P1/P2 value is preferably 1.2 to 3.0, and more preferably 1.5 to 3.0, from the viewpoint of further improvement in the charge-discharge efficiency of the negative electrode 23. A coating having the P1/P2 value of more than 3.0 becomes a dense coating and may lower a Li-ion conductivity. Therefore, an upper limit of the P1/P2 value of the coating is specified to 3.0 in the present disclosure.

The XPS spectrum measured by X-ray photoelectron spectroscopy may be measured under the following condition, for example.

Measurement Device: PHI5000 VersaProbe, manufactured by ULVAC-PHI, Inc.

X-ray Source Used: monochrome Mg-Kα, 200 nmφ, 45 W, 17 kV

Region for Analysis: approximately 200 μmφ

The coating may be formed on the surface of the carbon material by, for example, assembling the secondary battery 20, and then charging and discharging the secondary battery 20 to reductively decompose the electrolyte liquid 27. The coating may also be formed on the surface of the carbon material by, for example, immersing a negative electrode including the carbon material and a counter electrode in an electrolyte liquid for forming the coating before assembling the secondary battery 20, and applying a voltage to reductively decompose the electrolyte liquid for forming the coating. In this case, the negative electrode treated with the electrolyte liquid for forming the coating is used to assemble the secondary battery 20. The electrolyte is used in an operational state of the battery.

When the coating is formed by the reductive decomposition of the electrolyte liquid 27 after assembling the secondary battery 20, the electrolyte liquid 27 preferably includes an organic solvent. The organic solvent is preferably a fluorine-containing organic solvent, and preferably, for example, cyclic or chain fluorinated carbonates such as fluoroethylene carbonate and fluorodimethyl carbonate, and fluorinated carboxylates such as methyl fluoropropionate and trifluoromethyl acetate, from the viewpoints of easiness of formation of the coating including LiF, and the like. The organic solvent is preferably fluorine-free organic solvent, and preferably, for example, fluorine-free carbonates such as ethylene carbonate and dimethyl carbonate, from the viewpoints of easiness of formation of the coating including $Li_2CO_3$, and the like. A content of the fluorine-containing organic solvent is preferably 60% to 90% at a volume rate based on a total amount of the solvent from the viewpoint of easiness of formation of the coating having the P1/P2 value within the above range.

The electrolyte liquid 27 preferably includes a fluorine-containing lithium salt from the viewpoints of easiness of formation of the coating including LiF, and the like. The fluorine-containing lithium salt is not particularly limited, but preferably lithium bis(trifluoromethanesulfonyl)imide (LiTFSI), lithium bis(perfluoroethanesulfonyl)imide (LiBETI), lithium (perfluoroethanesulfonyl)(trifluoromethanesulfonyl)imide, lithium bis(fluorosulfonyl)imide (LiF SI), lithium (fluorosulfonyl)(trifluoromethanesulfonyl)imide (LiFTI), and the like from the viewpoints of easiness of formation of the coating including LiF, and the like.

When the coating is formed on the surface of the carbon material by immersing the negative electrode including the carbon material in the electrolyte liquid for forming the coating before assembling the secondary battery 20 to reductively decompose the electrolyte liquid for forming the coating, the electrolyte liquid for forming the coating preferably includes an organic solvent such as fluorine-containing organic solvents and fluorine-free organic solvent, and a fluorine-containing lithium salt, similar to the above electrolyte liquid 27. The negative electrode immersed in the electrolyte liquid for forming the coating is produced by, for example, applying a negative electrode mixture slurry including the negative electrode active material, the binder, and the like on the negative electrode current collector, and drying and rolling the applied film to form the negative electrode mixture layer on the negative electrode current collector. When the coating is formed on the surface of the carbon material by using the electrolyte liquid for forming the coating, the fluorine-containing organic solvent or the fluorine-containing lithium salt may not be added into the electrolyte liquid 27 of the secondary battery 20.

The negative electrode active material may include materials usable for negative electrode active materials of conventional lithium-ion secondary batteries in addition to the above carbon material without impairing the effect of the present disclosure. Examples thereof include an alloy, metal compounds such as a metal oxide, a metal sulfide, and a metal nitride, which include a lithium element, and silicon. Examples of the alloy having the lithium element include lithium-aluminum alloy, lithium-tin alloy, lithium-lead alloy, and lithium-silicon alloy. Examples of the metal oxide having the lithium element include lithium titanate (such as $Li_4Ti_5O_{12}$). Examples of the metal nitride containing the lithium element include lithium-cobalt nitride, lithium-iron nitride, and lithium-manganese nitride. Sulfur-based compounds may also be exemplified.

The separator 24 is not particularly limited as long as it has functions of lithium-ion permeation and electrical separation between the positive electrode and the negative electrode, and for example, a porous sheet composed of a resin, an inorganic material, or the like is used. Specific examples of the porous sheet include a fine porous thin film, a woven fabric, and a nonwoven fabric. Examples of the material of the separator 24 include olefin resins such as polyethylene and polypropylene, a polyamide, a polyamideimide, and cellulose. Examples of the inorganic material constituting the separator 24 include glass and ceramics such as borosilicate glass, silica, alumina, and titania. The separator 24 may be a stacked body having a cellulose fiber layer and a thermoplastic resin fiber layer such as an olefin resin. The separator 24 may be a multilayer separator including a polyethylene layer and a polypropylene layer, and may be a separator in which a material such as an aramid resin and ceramics is applied on a surface thereof.

EXAMPLES

Hereinafter, the present disclosure will be further described with Examples, but the present disclosure is not limited to these Examples.

Example 1

[Negative Electrode]

A surface-modified carbon material in which a surface of an artificial graphite is coated with an amorphous carbon was used as a negative electrode active material. An amount of the amorphous carbon in the surface-modified carbon material was 2 parts by mass based on 100 parts by mass of the artificial graphite. The D/G value of the surface-modified carbon material in Example 1 was 0.253.

The above surface-modified carbon material (negative electrode active material) and PVDF as a binder were mixed at a solid-content mass ratio of 96:4 in N-methyl-2-pyrrolidone (NMP) to prepare a negative electrode mixture slurry. Next, this negative electrode mixture slurry was applied on a negative electrode current collector made of copper foil, and the applied film was dried and then rolled with a roller to produce an electrode.

[Positive Electrode]

$LiCoO_2$ as a positive electrode active material, carbon black as a conductive agent, and PVdF as a binder were mixed at a mass ratio of 94:3:3 in NMP to prepare a positive electrode mixture slurry. Next, this positive electrode mixture slurry was applied on a positive electrode current collector made of Al foil, and the applied film was dried and then rolled with a roller. Then, the rolled product was cut to a predetermined electrode size to obtain a positive electrode.

[Electrolyte Liquid]

Lithium salts (LITFSI:LIBETI=1.0:0.4 (molar ratio)), fluoroethylene carbonate (FEC), and water were mixed so that the molar ratio was 1.4:2.6:1.2 to prepare an electrolyte liquid.

[Test Cell]

Leads were attached to each of the negative electrode and the positive electrode, an electrode assembly in which each electrode was oppositely disposed with the separator interposed therebetween was inserted into an exterior housing body composed of an aluminum laminated sheet, vacuum drying was performed at 105° C. for 2 hours and 30 minutes, then the electrolyte liquid was injected, and an opening of the exterior housing body was sealed to produce a test cell (laminate cell).

Example 2

A surface-modified carbon material in which a surface of an artificial graphite is coated with an amorphous carbon was used as a negative electrode active material. An amount of the amorphous carbon in the surface-modified carbon material was 2 parts by mass based on 100 parts by mass of the artificial graphite. The artificial graphite in Example 2 differed from the artificial graphite in Example 1. The surface-modified carbon material in Example 2 was more amorphous-like in the bulk structure than the surface-modified carbon material in Example 1. The D/G value of the surface-modified carbon material in Example 2 was 0.253. A test cell was constructed in the same manner as in Example 1 except that the above surface-modified carbon material was used as the negative electrode active material.

Example 3

A surface-modified carbon material in which a surface of a natural graphite is coated with an amorphous carbon was used as a negative electrode active material. An amount of the amorphous carbon in the surface-modified carbon material was 4 parts by mass based on 100 parts by mass of the natural graphite. The D/G value of the surface-modified carbon material in Example 3 was 0.414. A test cell was constructed in the same manner as in Example 1 except that the above surface-modified carbon material was used as the negative electrode active material.

Example 4

A surface-modified carbon material in which a surface of a natural graphite is coated with an amorphous carbon was used as a negative electrode active material. An amount of the amorphous carbon in the surface-modified carbon material was 5 parts by mass based on 100 parts by mass of the natural graphite. The D/G value of the surface-modified carbon material in Example 4 was 0.416. A test cell was constructed in the same manner as in Example 1 except that the above surface-modified carbon material was used as the negative electrode active material.

Comparative Example 1

A surface-modified carbon material in which a surface of an artificial graphite is coated with an amorphous carbon was used as a negative electrode active material. An amount of the amorphous carbon in the surface-modified carbon material was 2 parts by mass based on 100 parts by mass of the artificial graphite. The D/G value of the surface-modified carbon material in Comparative Example 1 was 0.253.

A lithium salt (LITFSI), dimethyl carbonate (DMC), fluoroethylene carbonate (FEC), and water were mixed so that the molar ratio was 1.0:0.2:0.2:1.5 to prepare an electrolyte liquid.

A test cell was constructed in the same manner as in Example 1 except that: the above surface-modified carbon material was used as the negative electrode active material; and the above electrolyte liquid was used.

Comparative Example 2

A surface-modified carbon material in which a surface of an artificial graphite is coated with an amorphous carbon was used as a negative electrode active material. An amount of the amorphous carbon in the surface-modified carbon material was 2 parts by mass based on 100 parts by mass of the artificial graphite. The artificial graphite in Comparative Example 2 differed from the artificial graphite in Comparative Example 1. The surface-modified carbon material in Comparative Example 2 was more amorphous-like in the bulk structure than the surface-modified carbon material in Comparative Example 1. The D/G value of the surface-modified carbon material in Comparative Example 2 was 0.253. A test cell was constructed in the same manner as in Example 1 except that: the above surface-modified carbon material was used as the negative electrode active material; and the electrolyte liquid same as in Comparative Example 1 was used.

Comparative Example 3

A surface-modified carbon material in which a surface of a natural graphite is coated with an amorphous carbon was used as a negative electrode active material. An amount of the amorphous carbon in the surface-modified carbon material was 4 parts by mass based on 100 parts by mass of the natural graphite. The D/G value of the surface-modified carbon material in Comparative Example 3 was 0.414. A test cell was constructed in the same manner as in Example 1 except that: the above surface-modified carbon material was used as the negative electrode active material; and the electrolyte liquid same as in Comparative Example 1 was used.

Comparative Example 4

A surface-modified carbon material in which a surface of a natural graphite is coated with an amorphous carbon was used as a negative electrode active material. An amount of the amorphous carbon in the surface-modified carbon material was 5 parts by mass based on 100 parts by mass of the natural graphite. The D/G value of the surface-modified carbon material in Comparative Example 3 was 0.416. A test cell was constructed in the same manner as in Example 1 except that: the above surface-modified carbon material was used as the negative electrode active material; and the electrolyte liquid same as in Comparative Example 1 was used.

[Evaluation of Charge-Discharge Efficiency]

Each of the test cells of Examples and Comparative Examples was charged under a temperature environment at 25° C. at a constant current of 0.2C+0.05C until a battery voltage reached 3.7 V, and then discharged at a constant current of 0.2C+0.05C until a battery voltage reached 2.5 V. Charge and discharge capacities in this time were measured to determine a charge-discharge efficiency based on the following formula.

Charge-Discharge Efficiency=(Discharge Capacity/Charge Capacity)×100

On each of test cells of Examples and Comparative Examples that was produced separately from the evaluation of the charge-discharge efficiency, the above charge and discharge were performed 3 cycles. Each test cell after the charges and discharges was unpacked to take the surface-modified carbon material from the negative electrode, and an XPS spectrum of the coating formed on the surface of the surface-modified carbon material was measured with X-ray photoelectron spectroscopy to determine the P1/P2 value.

Table 1 shows the D/G values of the surface-modified carbon materials, P1/P2 values of the coatings, and results of charge-discharge efficiency of test cells of Examples 1 to 4 and Comparative Examples 1 to 4. The values of the charge-discharge efficiency shown are relative values relative to the value of Example 4 of 100, in the other Examples and Comparative Examples.

TABLE 1

| | Surface-modified carbon material D/G value | Coating P1/P2 value | Electrolyte liquid | Charge-discharge efficiency (relative value relative to value of Example 4 of 100) |
|---|---|---|---|---|
| Example 1 | 0.253 | 1.15 | Composition 1 | 41 |
| Example 2 | 0.253 | 1.23 | Composition 1 | 45 |
| Example 3 | 0.414 | 1.46 | Composition 1 | 45 |
| Example 4 | 0.416 | 1.57 | Composition 1 | 100 |
| Comparative Example 1 | 0.253 | 0.63 | Composition 2 | 0.66 |
| Comparative Example 2 | 0.253 | 0.58 | Composition 2 | 0.37 |
| Comparative Example 3 | 0.414 | 0.69 | Composition 2 | 0.54 |
| Comparative Example 4 | 0.416 | 0.78 | Composition 2 | 0.66 |

LiTFSI (1.0)+LiBETI (0.4)+FEC (2.6)+$H_2O$ (1.2) Composition 1:

LiTFSI (1.0)+DMC (0.2)+FEC (0.2)+$H_2O$ (1.5) Composition 2:

Numeral in ( ) is a molar ratio.

As is evident from Table 1, the surface-modified carbon materials used in Examples 1 to 2 and Comparative Examples 1 to 2 had the same D/G value, whereas the P1/P2 values of the coating formed on the surface of the carbon material were 1 or more in Examples 1 to 2 and less than 1 in Comparative Examples 1 to 2. Comparison between Examples 3 to 4 and Comparative Examples 3 to 4 also had the same tendency. This was because Examples that used the electrolyte liquid with a high content of the fluorinated carbonate (FEC) formed a coating with a high LiF rate on the surface of the surface-modified carbon material by the reductive decomposition of the electrolyte liquid. Any of Examples in which a coating having P1/P2 value of 1 or more, that is, coating having a higher LiF rate than Comparative Examples, was formed had improved charge-discharge efficiency compared with Comparative Examples. Among Examples 1 to 4, Example 4, which had the D/G value of the surface-modified carbon material of 0.4 or more and the P1/P2 value of the coating of 1.5 or more, demonstrated the highest charge-discharge efficiency.

REFERENCE SIGNS LIST

20 Secondary battery
21 Battery case
22 Positive electrode
23 Negative electrode
24 Separator
25 Gasket
26 Sealing plate
27 Electrolyte liquid

The invention claimed is:

1. A secondary battery, comprising:
a positive electrode;
a negative electrode; and
an electrolyte liquid,
wherein
the electrolyte liquid includes: a solvent containing water; and a lithium salt, and
an amount of water included in the electrolyte liquid is 0.5 mol to 4 mol based on 1 mol of the lithium salt in an operational state,
the negative electrode has a negative electrode active material including a carbon material,
the carbon material has a peak intensity ratio of a D band to a G band (D/G value) of 0.4 to 0.7 in a Raman spectrum obtained by Raman spectroscopy,
the carbon material has a coating formed on a surface thereof, and
in an XPS spectrum measured by X-ray photoelectron spectroscopy, when an intensity of a peak appearing near a bond energy of 685 eV and corresponding to a 1s electron orbital of a F atom is defined as P1, and an intensity of a peak appearing near a bond energy of 532 eV and corresponding to a 1s electron orbital of an O atom is defined as P2, the coating has a ratio of the peak intensity P1 to the peak intensity P2 (P1/P2 value) of 1.5 to 3.0.

2. The secondary battery according to claim 1, wherein the electrolyte liquid includes an organic solvent.

3. The secondary battery according to claim 2, wherein the organic solvent includes at least one fluorine-containing organic solvent from the group consisting of fluorodimethyl carbonate and fluorinated carboxylates.

4. The secondary battery according to claim 3, wherein the fluorinated carboxylates is at least one of the group consisting of methyl fluoropropionate and trifluoromethyl acetate.

5. The secondary battery according to claim 1, wherein the electrolyte liquid includes a fluorine-containing lithium salt.

6. The secondary battery according to claim 5, wherein the fluorine-containing lithium salt is at least one of the group consisting of lithium bis(trifluoromethanesulfonyl) imide (LiTFSI), lithium bis(perfluoroethanesulfonyl) imide (LiBETI), lithium (perfluoroethanesulfonyl)(trifluoromethanesulfonyl)imide, lithium bis(fluorosulfonyl)imide (LiFSI), and lithium (fluorosulfonyl)(trifluoromethanesulfonyl)imide (LIFTI).

7. The secondary battery according to claim 1, wherein the amount of water is preferably 10% or more and less than 50% at a volume rate based on a total amount of the solvent included in the electrolyte liquid.

8. The secondary battery according to claim 1, wherein the amount of water is 0.5 mol to 3 mol based on 1 mol of the lithium salt in the operational state.

9. The secondary battery according to claim 1, wherein the carbon material contains graphite.

10. The secondary battery according to claim 1, wherein the carbon material contains a natural graphite.

11. The secondary battery according to claim 10, wherein the natural graphite includes at least one selected from the group consisting of flake graphite, massive graphite, and amorphous graphite.

12. The secondary battery according to claim 1, wherein the carbon material contains an artificial graphite.

13. The secondary battery according to claim 12, wherein the artificial graphite includes at least one selected from the group consisting of massive artificial graphite (MAG) and graphitized mesophase-carbon microbead (MCMB).

14. The secondary battery according to claim 1, wherein the coating contains amorphous carbon.

15. The secondary battery according to claim 14, wherein the amorphous carbon is a calcined product.

16. The secondary battery according to claim 14, wherein the amorphous carbon is a calcined product of at least one selected from the group consisting of petroleum, coal, thermoplastic resin, and thermosetting resin.

17. The secondary battery according to claim 1, wherein the coating contains LiF.

18. The secondary battery according to claim 1, wherein the carbon material contains graphite and the coating contains amorphous carbon.

* * * * *